United States Patent
Uhrenholt

(10) Patent No.: US 10,559,056 B2
(45) Date of Patent: Feb. 11, 2020

(54) GRAPHICS PROCESSING

(71) Applicant: ARM Limited, Cambridge (GB)

(72) Inventor: Olof Henrik Uhrenholt, Lomma (SE)

(73) Assignee: Arm Limited, Cambridge (GB)

(*) Notice: Subject to any disclaimer, the term of this patent is extended or adjusted under 35 U.S.C. 154(b) by 106 days.

(21) Appl. No.: 15/620,403

(22) Filed: Jun. 12, 2017

(65) Prior Publication Data

US 2018/0357743 A1    Dec. 13, 2018

(51) Int. Cl.
*G06T 15/04* (2011.01)
*G06T 1/20* (2006.01)

(52) U.S. Cl.
CPC ..................... *G06T 1/20* (2013.01)

(58) Field of Classification Search
None
See application file for complete search history.

(56) References Cited

U.S. PATENT DOCUMENTS

| | | | | |
|---|---|---|---|---|
| 8,223,158 B1* | 7/2012 | Lindholm | ............. | G06T 1/20 345/506 |
| 2007/0030277 A1* | 2/2007 | Prokopenko | ............. | G06T 1/20 345/506 |
| 2007/0030279 A1* | 2/2007 | Paltashev | ............. | G06F 9/3836 345/506 |
| 2007/0030280 A1* | 2/2007 | Paltashev | ............. | G06T 1/20 345/506 |
| 2008/0007559 A1* | 1/2008 | Kalaiah | ............. | H04N 13/275 345/501 |
| 2008/0297528 A1* | 12/2008 | Kugler | ............. | G06T 15/04 345/582 |
| 2010/0214301 A1* | 8/2010 | Li | ............. | G06T 1/20 345/522 |
| 2010/0302261 A1* | 12/2010 | Abdo | ............. | G06T 3/00 345/506 |
| 2010/0328309 A1* | 12/2010 | Sarel | ............. | G06T 15/005 345/426 |
| 2011/0063285 A1* | 3/2011 | Hoover | ............. | G06T 15/005 345/419 |
| 2011/0063294 A1* | 3/2011 | Brown | ............. | G06T 15/005 345/423 |
| 2013/0215117 A1* | 8/2013 | Glaister | ............. | G06F 8/456 345/426 |

(Continued)

*Primary Examiner* — Martin Mushambo
(74) *Attorney, Agent, or Firm* — Vierra Magen Marcus LLP

(57) ABSTRACT

A data processing system replicates the operation of a target graphics processor under test by making use of a native graphics processor of the data processing system. The native graphics processor is provided with executable program instructions that replicate some or all of the fixed function operations of the target graphics processor. The programmable processing circuitry of the graphics processor of the data processing system can then generate an output by executing the executable program instructions, rather than by using fixed function processing circuitry of the graphics processor of the data processing system. The data processing system can provide a "bit-exact" testing environment when replicating the operation of the target graphics processor using the native graphics processor, for example where the target graphics processor and native graphics processor are configured very differently from one another.

19 Claims, 4 Drawing Sheets

(56) References Cited

U.S. PATENT DOCUMENTS

| | | | |
|---|---|---|---|
| 2014/0281389 A1* | 9/2014 | Loktyukhin | G06F 9/30196 |
| | | | 712/206 |
| 2015/0378741 A1* | 12/2015 | Lukyanov | G06F 9/3887 |
| | | | 712/226 |
| 2016/0055667 A1* | 2/2016 | Goel | G06T 15/83 |
| | | | 345/522 |
| 2017/0178386 A1* | 6/2017 | Redshaw | G06T 1/20 |

* cited by examiner

GRAPHICS PROCESSING

BACKGROUND

The technology described herein relates to replicating the operation of a graphics processor on a data processing system.

Before implementation of a graphics processor, for example that forms part of a system on chip (SoC), the operation of the graphics processor can be replicated using a software model running on a central processor of a data processing system, such as general purpose computer system. This can allow various features of the graphics processor, SoC, etc., such as the hardware configuration, software/hardware interface, etc., to be tested and/or modified before implementation.

The Applicants believe that there remains scope for improvements to replicating the operation of graphics processors on data processing systems.

BRIEF DESCRIPTION OF THE DRAWINGS

Various embodiments of the present technology will be described by way of example only and with reference to the accompanying drawings, in which.

Figure 1:
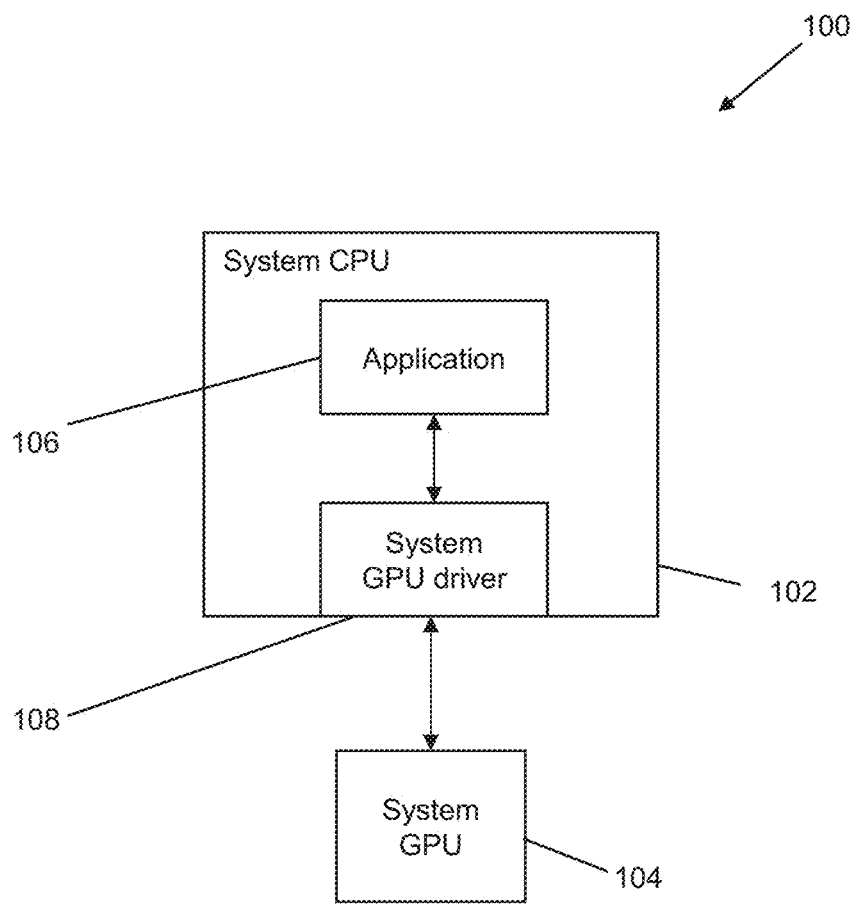
FIG. 1 shows schematically a data processing system that can be operated in the manner of the technology described herein.

The drawings show elements of data processing systems that are relevant to embodiments of the technology described herein. As will be appreciated by those skilled in the art, there may be other elements of the data processing systems that are not illustrated in the drawings. It should also be noted that the drawings are only schematic, and that, for example, in practice the shown elements may share significant hardware circuits, even though they are shown schematically as separate elements in the drawings. Like reference numerals are used for like elements where appropriate in the drawings.

DETAILED DESCRIPTION

An embodiment of the technology described herein comprises a method of replicating the operation of a target graphics processor on a data processing system that comprises a graphics processor, the method comprising:

providing executable program instructions for use by the graphics processor of the data processing system, the executable program instructions replicating fixed function operations that would be performed by substantially fixed function processing circuitry of the target graphics processor; and causing programmable processing circuitry of the graphics processor of the data processing system to generate an output, wherein generating the output comprises the programmable processing circuitry executing the executable program instructions to thereby replicate the fixed function operations of the target graphics processor.

Another embodiment of the technology described herein comprises a data processing system for replicating the operation of a target graphics processor, the data processing system comprising:

a graphics processor comprising programmable processing circuitry; and data processing circuitry configured to:

provide executable program instructions for use by the graphics processor of the data processing system, the executable program instructions replicating fixed function operations that would be performed by substantially fixed function processing circuitry of the target graphics processor; and cause the programmable processing circuitry of the graphics processor of the data processing system to generate an output, wherein generating the output comprises the programmable processing circuitry executing the executable program instructions to thereby replicate the fixed function operations of the target graphics processor.

The Applicants have identified that replicating the operation of a target graphics processor on a data processing system can consume a significant amount of processing time and resources, particularly in typical arrangements in which the operation of the target graphics processor is replicated entirely in software on a central processor of the data processing system. This is because central processors tend to have only a small number of processing cores and thus are not generally well suited to performing the data processing operations that are usually performed by a graphics processor (which often comprise executing many operations in parallel using many processing cores).

In the technology described herein however, rather than replicating the operation of a target graphics processor entirely on a central processor of the data processing system, the (test) data processing system makes use of a (native) graphics processor of that data processing system, which is generally better suited for performing the data processing operations that are usually performed by a graphics processor (for example by executing many operations in parallel using many processing cores of the graphics processor). Thus, in the technology described herein, the amount of processing time and resources that are consumed when replicating the operation of a target graphics processor on a data processing system can be significantly lower than in typical arrangements.

The Applicants have further identified that a (e.g. general purpose) graphics processor of a data processing system and a (e.g. specialised) target graphics processor under consideration are often configured very differently from one another. For example, the fixed function processing circuitry (hardware) of the target graphics processor may be configured differently to the equivalent fixed function processing circuitry of the graphics processor of the data processing system. The fixed function processing circuitry of the target graphics processor may, for example, be configured to produce results that are of a different (e.g. higher or lower) precision than the equivalent fixed function processing circuitry of the graphics processor of the data processing system. Furthermore, application programming interfaces (APIs) for graphics processors tend not to be able to specify a desired level of precision. Thus, a graphics processor of a data processing system typically may not be able to generate a suitable output (e.g. a suitably precise output) when replicating the operation of a target graphics processor.

The technology described herein however, comprises providing executable program instructions for use by the graphics processor of the data processing system that replicate some or all of the fixed function operations of the target graphics processor. The technology described herein then comprises causing the programmable processing circuitry of the graphics processor of the data processing system to generate an output by executing those executable program instructions, e.g. rather than by using fixed function processing circuitry of the graphics processor of the data processing system. This can allow the graphics processor of the data processing system to generate an output (e.g. a "bit-exact" output) that is the same or substantially the same (e.g. precision) as that which would have been generated by the fixed function processing circuitry of the target graphics processor. This in turn allows more accurate testing and simulation of the target graphics processor on the data processing system.

The executable program instructions for the graphics processor of the data processing system can take any desired and suitable form that can be interpreted and followed by the graphics processor of the data processing system. For example, the executable program instructions for the graphics processor of the data processing system may comprise binary code to be followed by the graphics processor of the data processing system. The executable program instructions may therefore comprise instructions which are specified in the instruction set specification for the graphics processor of the data processing system.

Providing the executable program instructions for use by the graphics processor of the data processing system may be performed in any desired and suitable way. For example, providing the executable program instructions for use by the graphics processor of the data processing system may comprise providing higher level program expressions that are functionally equivalent to the fixed function operations that would be performed by the substantially fixed function processing circuitry of the target graphics processor. The higher level program expressions may then be converted (e.g. compiled) to the (lower level) executable program instructions for the graphics processor of the data processing system.

The higher level program expressions can take any desired and suitable form. The higher level program expressions may, for example, be written in any desired and suitable programming language, such as C++, Cuda, OpenCL, etc. The higher level program expressions may indicate any desired and suitable programming functions defined in the relevant language standards (specifications).

It should be noted here that references to "program expressions" herein may refer to language constructs that are to be compiled to processor binary code (i.e. that are to be expressed in hardware micro-instructions). Such language constructs may, depending on the language in question, be referred to as "expressions", "statements", etc. For convenience, the term "expressions" will be used herein, but this is intended to encompass all equivalent language constructions such as "statements". "Instructions" correspondingly may refer to the actual hardware instructions (code) that are emitted to perform an "expression".

Converting the higher level program expressions for the graphics processor of the data processing system into executable program instructions for the graphics processor of the data processing system may be performed in any desired and suitable way. For example, converting the higher level program expressions for the graphics processor of the data processing system into executable program instructions for the graphics processor of the data processing system may proceed through one or more intermediate representations of the higher level program expressions to produce the executable program instructions. Thus, providing the executable program instructions for use by the graphics processor of the data processing system may comprise converting higher level program expressions that are functionally equivalent to the fixed function operations into an intermediate representation of the higher level program expressions, and then converting the intermediate representation of the higher level program expressions into the executable program instructions.

The one or more intermediate representations for the executable program instructions can take any desired and suitable form. For example, the one or more intermediate representations may be represented in any desired and suitable intermediate language and/or compute API language, such as LLVM, OpenCL, PTX, HSAIL, SPIR, etc.

The process of converting the higher level program expressions for the graphics processor of the data processing system into the executable program instructions for the graphics processor of the data processing system may be performed, at least in part, prior to run time or "offline", e.g. well before the graphics processor is instructed to generate the desired output. These embodiments can, for example, allow the higher level program expressions to be processed, at least in part, in advance. Thus, embodiments may comprise, prior to run time, converting the higher level program expressions into an intermediate representation of the higher level program expressions. Embodiments may then comprise, at run time, converting the intermediate representation of the higher level program expressions into the executable program instructions, e.g. just prior to or while the graphics processor is being instructed to generate the desired output.

Embodiments may further comprise providing control data for generating the desired output. The control data for generating the desired output can take any desired and suitable form. For example, the control data for generating the desired output may comprise one or more (e.g. job or draw call) descriptors. The control data for generating the desired output may, for example, comprise an indication of the settings (e.g. register settings, framebuffer settings, texture settings, etc.) and/or input/output resources (e.g. in-memory data structures, buffers, etc.) to be used when generating the desired output. Embodiments may then comprise causing the graphics processor of the data processing system to generate the desired output in accordance with the control data, e.g. when executing the executable program instructions that replicate the fixed function operations.

Embodiments may further comprise considering (e.g. parsing) the control data for generating the desired output. Considering the control data for generating the desired output may comprise identifying, from that control data, a (specific) subset of processing operations that are to be performed, for example from a (general) set of processing operations for which executable program instructions can be provided (and for which higher level program expressions are provided). For example, the control data for generating the desired output (e.g. the descriptors) may indicate that one or more processing operations (e.g. rasterisation, fragment shading, etc.) are to be performed when generating the desired output, whereas one or more other processing operations (e.g. downsampling) are not to be performed when generating the desired output.

Embodiments may then comprise selecting the executable program instructions to be provided to the graphics processor of the data processing system based on the control data for generating the desired output. For example, when the control data for generating the desired output indicates that (only) a subset of executable program instructions of a set of executable program instructions is required when generating the desired output, then (only) that subset of executable program instructions of the set of executable program instructions may be selected and provided to the graphics processor of the data processing system for use when generating the desired output. For example, the executable program instructions for one or more processing operations (e.g. rasterisation, fragment shading, etc.) may be selected and provided for use when generating the desired output, but the executable program instructions for one or more other processing operations (e.g. downsampling) may not be selected and provided for use when generating the desired output.

Embodiments may then comprise causing the programmable processing circuitry of the graphics processor of the data processing system to generate the desired output by executing (only) the selected executable program instructions. For example, the executable program instructions for one or more processing operations (e.g. rasterisation, fragment shading, etc.) may be executed when generating the desired output, but the executable program instructions for one or more other processing operations (e.g. downsampling) may not be executed when generating the desired output.

These embodiments can accordingly help to remove redundant executable program instructions, thereby reducing the amount of executable program instructions issued to the graphics processor of the data processing system, and thus improving the processing efficiency of the graphics processor of the data processing system when generating the desired output.

Selecting the executable program instructions to be provided to the graphics processor of the data processing system based on the control data for generating the desired output may be performed in any desired and suitable way. For example, selecting the executable program instructions may comprise modifying an intermediate representation of the higher level program expressions based on the control data for generating the desired output. For example, parts of the intermediate representation of the higher level program expressions may be modified or removed based on the control data for generating the desired output.

As indicated above, the higher level program expressions, and/or one or more of the intermediate representations (if used), may be provided prior to run time. However, the control data for generating the desired output may be considered, and/or the executable program instructions may be selected (e.g. an intermediate representation for the higher level program expressions may be modified), at run time. This can allow relevant and current control data for generating the desired output to be used to select the executable program instructions in use, whilst still allowing more complex and/or more general higher level program expressions to be processed, at least in part, in advance.

Selecting the executable program instructions to be provided to the graphics processor of the data processing system based on the control data for generating the desired output may be performed by any desired and suitable part of the data processing system. For example, a partial evaluation (Just in Time or "JIT") compiler may perform this function.

Providing the control data for generating the desired output may be performed in any desired and suitable way. For example, providing the control data for generating the desired output may comprise providing higher level commands intended for the target graphics processor. The higher level commands intended for the target graphics processor may then be converted into the (lower level) control data for generating the desired output.

Converting the higher level commands intended for the target graphics processor into the control data for generating the desired output may be performed in any desired and suitable way. For example, converting the higher level commands intended for the target graphics processor into the control data for generating the desired output may comprise converting the higher level commands intended for the target graphics processor into lower level control data suitable for the target graphics processor (e.g. rather than directly into control data for the graphics processor of the data processing system). Embodiments may then comprise converting the lower level control data suitable for use by the target graphics processor into the lower level control data for the graphics processor of the data processing system.

In this regard, the Applicants have identified that replicating the operation of a target graphics processor on a data processing system typically requires a driver for the target graphics processor (which would usually be used to convert higher level commands for the target graphics processor into lower level control data for the target graphics processor) to be replaced, e.g. with code that converts the higher level commands intended for the target graphics processor directly into lower level control data for a processor of the data processing system, such that the processor of the data processing system can then follow the commands that were intended for the target graphics processor. This means that the operation of the target graphics processor may not be appropriately tested when replicating the operation of the target graphics processor on the data processing system since significant, e.g. driver, processes for the target graphics processor are replaced.

In embodiments however, the higher level commands intended for the target graphics processor may still be converted into lower level control data suitable for use by the target graphics processor (e.g. as would be performed using a driver for the target graphics processor). This is despite the fact that that lower level control data will not actually be used by (and may not be suitable for) the target graphics processor. The data processing system may then convert the lower level control data for the target graphics processor into lower level control data for the graphics processor of the data processing system, such that the graphics processor of the data processing system can then follow the original higher level commands which were intended for the target graphics processor. These embodiments can therefore provide a more comprehensive testing environment for the target graphics processor by including a process of converting the higher level commands for the target graphics processor into lower level control data for the target graphics processor (e.g. as would be performed by a driver for the target graphics processor).

The higher level commands intended for the target graphics processor can take any desired and suitable form. For example, the higher level commands intended for the target graphics processor may comprise application programming interface (API) calls (e.g. job or draw calls) intended for the target graphics processor.

The lower level control data suitable for use by the target graphics processor can also take any desired and suitable form that can be interpreted and used by the target graphics processor. The lower level control data suitable for use by the target graphics processor may, for example, comprise an indication of the settings (e.g. register settings, framebuffer settings, texture settings, etc.) and/or input/output resources (e.g. in-memory data structures, buffers, etc.) to be used by the target graphics processor. For example, the lower level control data suitable for use by the target graphics processor may comprise one or more (e.g. job or draw call) descriptors suitable for use by the target graphics processor.

Converting the higher level commands intended for the target graphics processor into lower level control data suitable for use by the target graphics processor may be performed in any desired and suitable way. For example, converting the higher level commands intended for the target graphics processor into lower level control data suitable for use by the target graphics processor may comprise mapping API calls (e.g. job or draw calls) for the target graphics processor to (e.g. job or draw call) descriptors suitable for use by the target graphics processor.

Converting the higher level commands intended for the target graphics processor into the lower level control data suitable for use by the target graphics processor may also be performed in or by any desired and suitable part of the data processing system. For example, as is indicated above, a driver for the target graphics processor may perform this process. As indicated above, these embodiments can avoid the need to replace the driver for the target graphics processor.

Converting the lower level control data suitable for use by the target graphics processor into the lower level control data for the graphics processor of the data processing system may also be performed in any desired and suitable way. For example, embodiments may comprise converting the lower level control data suitable for use by the target graphics processor into higher level commands for the graphics processor of the data processing system. Embodiments may then comprise converting the higher level commands for the graphics processor of the data processing system into the lower level control data for the graphics processor of the data processing system.

The higher level commands for the graphics processor of the data processing system can again take any desired and suitable form. For example, the higher level commands for the graphics processor of the data processing system may comprise API (e.g. job or draw) calls for the graphics processor of the data processing system.

Converting the lower level control data suitable for use by the target graphics processor into the higher level commands for the graphics processor of the data processing system may also be performed in any desired and suitable way. For example, converting the lower level control data suitable for use by the target graphics processor into higher level commands for the graphics processor of the data processing system may comprise remapping (e.g. job or draw call) descriptors for the target graphics processor to API (e.g. job or draw) calls for the graphics processor of the data processing system.

Converting the higher level commands for the graphics processor of the data processing system into the lower level control data for the graphics processor of the data processing system may also be performed in any desired and suitable way. For example, converting the higher level commands for the graphics processor of the data processing system into the lower level control data for the graphics processor of the data processing system may comprise mapping API (e.g. job or draw) calls for the graphics processor of the data processing system to (e.g. job or draw call) descriptors for the graphics processor of the data processing system.

Converting the higher level commands for the graphics processor of the data processing system into the lower level control data for the graphics processor of the data processing system may also be performed in or by any desired and suitable part of the data processing system. For example, a driver for the graphics processor of the data processing system may perform this process. These embodiments can avoid the need to replace the driver for the graphics processor of the data processing system.

As will be appreciated, the higher level commands intended for the target graphics processor and/or the lower level control data for the graphics processor of the data processing system will typically be provided at run time, e.g. so as to cause the graphics processor to generate the desired output.

In embodiments, in addition to fixed function processing circuitry, the target graphics processor may further comprise programmable processing (e.g. shader) circuitry. These embodiments may comprise providing further (e.g. shader) program instructions for use by the graphics processor of the data processing system. The further program instructions may replicate further (e.g. shader) operations of the target graphics processor that would be performed by programmable processing circuitry of the target graphics processor. Embodiments may then comprise causing the programmable processing circuitry of the graphics processor of the data processing system to generate the output by executing the further program instructions for the graphics processor of the data processing system, e.g. together with the executable program instructions that replicate the fixed function operations that would be performed by substantially fixed function processing circuitry of the target graphics processor and/or in accordance with the control data for the desired output. Thus, generating the output may further comprise the programmable processing circuitry of the graphics processor of the data processing system executing the further program instructions to thereby replicate the further operations of the target graphics processor.

The further (e.g. shader) program instructions for the graphics processor of the data processing system can also take any desired and suitable form that can be interpreted and followed by the graphics processor of the data processing system. For example, the further program instructions for the graphics processor of the data processing system may comprise binary code to be followed by the graphics processor of the data processing system. The further program instructions for the graphics processor of the data processing system may comprise instructions which are specified in the instruction set specification for the graphics processor of the data processing system.

Providing the further (e.g. shader) program instructions for the graphics processor of the data processing system may be performed in any desired and suitable way. For example, providing further program instructions for the graphics processor of the data processing system may comprise providing higher level (e.g. shader) program expressions intended for the target graphics processor. The higher level program expressions intended for the target graphics processor may then be converted into the further program instructions for the graphics processor of the data processing system.

The higher level (e.g. shader) program expressions intended for the target graphics processor can take any desired and suitable form. For example, the higher level program expressions intended for the target graphics processor may comprise program expressions for one or more (e.g. shader) programs intended for the target graphics processor. The higher level program expressions for the target graphics processor may be written in any desired and suitable (e.g. shader) programming language, such as GLSL, HLSL, OpenCL, etc. The higher level program expressions intended for the target graphics processor may indicate any desired programming functions defined in the relevant language standards (specifications).

Converting the higher level (e.g. shader) program expressions intended for the target graphics processor into the further (e.g. shader) program instructions for the graphics processor of the data processing system may be performed in any desired and suitable way. For example, converting the higher level program expressions intended for the target graphics processor into the further instructions for the graphics processor of the data processing system may proceed through one or more intermediate representations to produce the further instructions.

The one or more intermediate representations for the further (e.g. shader) program instructions can take any desired and suitable form. For example, the one or more intermediate representations for the lower level (e.g. shader) program instructions may be represented in any desired and suitable intermediate language and/or compute API language, such as LLVM, OpenCL, PTX, HSAIL, SPIR, etc.

Converting the higher level (e.g. shader) program expressions intended for the target graphics processor into the further (e.g. shader) program instructions for the graphics processor of the data processing system may, for example, comprise converting the higher level program expressions intended for the target graphics processor into lower level (e.g. shader) program instructions suitable for use by the target graphics processor (e.g. rather than the graphics processor of the data processing system). Embodiments may then comprise converting the lower level program instructions suitable for use by the target graphics processor into the further program instructions for the graphics processor of the data processing system.

In this regard, the Applicants have again identified that replicating the operation of a target graphics processor on a data processing system typically requires a compiler (e.g. of a driver) for the target graphics processor (which would usually be used to convert higher level (e.g. shader) program expressions for the target graphics processor into lower level (e.g. shader) program instructions for the target graphics processor) to be replaced, e.g. with code that converts the higher level program expressions intended for the target graphics processor directly into lower level instructions for a processor of the data processing system, such that the processor of the data processing system can then follow the higher level program expressions that were intended for the target graphics processor. This means that the operation of the target graphics processor may not be appropriately tested when replicating the operation of the target graphics processor on the data processing system since significant, e.g. compiler, processes for the target graphics processor are replaced.

In embodiments however, the higher level (e.g. shader) program expressions intended for the target graphics processor may still be converted into lower level (e.g. shader) program instructions suitable for use by the target graphics processor (e.g. as would be performed using a compiler (e.g. of a driver) for the target graphics processor). This is despite the fact that the lower level program instructions will not actually be used by (and may not be suitable for) the target graphics processor. The data processing system may then convert the lower level program instructions for the target graphics processor into lower level (e.g. shader) program instructions for the graphics processor of the data processing system, such that the graphics processor of the data processing system can then follow the original higher level program expressions which were intended for the target graphics processor. These embodiments can therefore provide a more comprehensive testing environment for the target graphics processor by including a process of converting the higher level (e.g. shader) program expressions for the target graphics processor into lower level instructions for the target graphics processor (e.g. as would be performed by a compiler (e.g. of a driver) for the target graphics processor).

The lower level (e.g. shader) program instructions suitable for use by the target graphics processor can take any desired and suitable form that can be interpreted and followed by the target graphics processor. For example, the lower level (e.g. shader) program instructions suitable for use by the target graphics processor may comprise binary code to be followed by the target graphics processor. The lower level program instructions suitable for use by the target graphics processor may comprise instructions which are specified in the instruction set specification for the target graphics processor.

Converting the higher level (e.g. shader) program expressions intended for the target graphics processor into the lower level (e.g. shader) program instructions suitable for use by the target graphics processor may be performed in any desired and suitable way. For example, converting the higher level program expressions intended for the target graphics processor into the lower level program instructions suitable for use by the target graphics processor may comprise compiling the higher level program expressions into binary code suitable for use by the target graphics processor.

Converting the higher level (e.g. shader) program expressions intended for the target graphics processor into the lower level (e.g. shader) program instructions suitable for use by the target graphics processor may also be performed in or by any desired and suitable part of the data processing system. For example, as indicated above, a compiler (e.g. of a driver) for the target graphics processor may perform this process. These embodiments can accordingly avoid the need to replace the compiler (and, e.g., driver) for the target graphics processor.

Converting the lower level (e.g. shader) program instructions suitable for use by the target graphics processor into the further (e.g. shader) program instructions for the graphics processor of the data processing system may also be performed in any desired and suitable way. For example, embodiments may comprise converting the lower level program instructions suitable for use by the target graphics processor into higher level (e.g. shader) program expressions for the graphics processor of the data processing system. Embodiments may then comprise converting the higher level program expressions for the graphics processor of the data processing system into the further (e.g. shader) program instructions for the graphics processor of the data processing system.

Converting the lower level (e.g. shader) program instructions suitable for use by the target graphics processor into the higher level (e.g. shader) program expressions for the graphics processor of the data processing system may be performed in any desired and suitable way. For example, converting the lower level program instructions suitable for use by the target graphics processor into the higher level program expressions for the graphics processor of the data processing system may comprise decompiling binary code for the target graphics processor into (e.g. functionally equivalent) higher level (e.g. shader) program expressions for the graphics processor of the data processing system.

The higher level (e.g. shader) program expressions for the graphics processor of the data processing system can take any desired and suitable form. For example, the higher level program expressions for the graphics processor of the data processing system may comprise (e.g. shader) program expressions for one or more (e.g. shader) programs for the graphics processor of the data processing system. The higher level program expressions for the graphics processor of the data processing system may be written in any desired and suitable (e.g. shader) language, such as GLSL, HLSL, OpenCL, etc. In some embodiments, the higher level program expressions for the graphics processor of the data processing system are written in the same programming language as the higher level program expressions for the target graphics processor. In other embodiments, the higher level program expressions for the graphics processor of the data processing system are written in one or more different (e.g. shader) programming languages to the higher level program expressions intended for the target graphics processor.

Converting the higher level (e.g. shader) program expressions for the graphics processor of the data processing system into the further (e.g. shader) program instructions for the graphics processor of the data processing system may be performed in any desired and suitable way. For example, converting the higher level program expressions for the graphics processor of the data processing system into the further program instructions for the graphics processor of the data processing system may comprise compiling the higher level program expressions for the graphics processor of the data processing system into binary code for the graphics processor of the data processing system.

Converting the higher level (e.g. shader) program expressions for the graphics processor of the data processing system into the further (e.g. shader) program instructions suitable for use by the graphics processor of the data processing system may also be performed in or by any desired and suitable part of the data processing system. For example, a compiler (e.g. of a driver) for the graphics processor of the data processing system may perform this process. These embodiments can accordingly avoid the need to replace the compiler (and, e.g., driver) for the graphics processor of the data processing system.

As will be appreciated, the higher level (e.g. shader) program expressions intended for the target graphics processor and/or the further (e.g. shader) program instructions for the graphics processor of the data processing system may be provided at run time, e.g. so as to cause the graphics processor to generate the desired output.

The graphics processor of the data processing system may replicate any desired and suitable processing operations, such as graphics processing operations, that a target graphics processor may be desired to perform. The graphics processor of the data processing system may, for example, be intended to replicate the implementation of a processing pipeline of the target graphics processor (e.g. a graphics processing pipeline of the target graphics processor). Thus, the processing operations (including the fixed function operations and, if used, programmable (e.g. shader) operations) to be replicated may be intended to be carried out in a pipelined fashion, with one or more pipeline stages operating on input data to generate the desired (e.g. render) output, e.g. a graphics texture or frame. The graphics processor of the data processing system may comprise any desired and suitable programmable processing circuitry (e.g. one or more programmable processing cores, programmable compute units, etc.) configured for this purpose.

As will be appreciated from the above, the processing pipeline of the target graphics processor may comprise one or more substantially fixed-function processing stages to be replicated. The one or more substantially fixed-function processing stages to be replicated may comprise dedicated processing circuitry configured to perform particular processing operations to generate the desired data. For example, the processing pipeline to be replicated may include one or more of a primitive assembly stage, a rasterisation stage, an early Z (depth) and/or stencil test stage, a texture filtering stage (e.g. of a fragment shading stage), a varying interpolation stage (e.g. of a fragment shading stage), a late Z (depth) and/or stencil test stage, a blender stage, and a downsampling (multisample resolve) stage. Such a fixed-function processing stage may perform processing operations on a set of input data to generate a desired set of output data for processing by the rest of the pipeline and/or for output. Thus, the one or more substantially fixed-function processing stages of the target graphics processor may be configured to implement one or more particular data processing operations, and the target graphics processor may comprise any desired and suitable (e.g. dedicated) hardware (processing circuitry) configured for this purpose.

As indicated above, the executable program instructions provided for use by the graphics processor of the data processing system may replicate at least part of a processing pipeline (e.g. graphics processing pipeline) of the target graphics processor as discussed above. The executable program instructions provided for use by the graphics processor of the data processing system may accordingly replicate one or more of a primitive assembly stage, a rasterisation stage, an early Z (depth) and/or stencil test stage, a texture filtering stage (e.g. of a fragment shading stage), a varying interpolation stage (e.g. of a fragment shading stage), a late Z (depth) and/or stencil test stage, a blender stage, and a downsampling (multisample resolve) stage. The executable program instructions provided for use by the graphics processor of the data processing system may, for example, replicate the operation of one or more substantially fixed function stages (e.g. rasterisation stage, etc.) of the target graphics processor when those executable program instructions are executed by the programmable processing circuitry of the graphics processor of the data processing system, e.g. rather than using substantially fixed function (e.g. rasterisation, etc.) circuitry of the graphics processor of the data processing system.

As will also be appreciated from the above, the processing pipeline of the target graphics processor may include one or more programmable processing stages, such as programmable shading stages ("shaders"), to be replicated. The one or more programmable processing stages to be replicated may execute (e.g. shader) programs to perform processing operations to generate the desired data. For example, the processing pipeline to be replicated may include one or more of a vertex shader, a geometry shader, and a fragment (pixel) shader. Such a programmable processing stage may execute (e.g. shader) programs on a set of input data to generate a set of output data for processing by the rest of the pipeline and/or for output. Thus, the one or more programmable processing stages of the target graphics processor may implement one or more (e.g. shader) programs, and the target graphics processor may comprise any desired and suitable programmable processing circuitry configured for this purpose.

As indicated above, the further (e.g. shader) program instructions provided for use by the graphics processor of the data processing system may replicate at least part of a processing pipeline (e.g. graphics processing pipeline) of the target graphics processor as discussed above. The further program instructions provided for use by the graphics processor of the data processing system may accordingly replicate one or more of a vertex shader, a geometry shader, and a fragment (pixel) shader. The further program instructions provided for use by the graphics processor of the data processing system may therefore replicate the operation of one or more programmable processing stages (e.g. fragment (pixel) shader, etc.) of the target graphics processor when those further program instructions are executed by the programmable processing circuitry of the graphics processor of the data processing system.

Thus, the graphics processor of the data processing system may replicate a processing pipeline (e.g. a graphics processing pipeline) of a target graphics processor. In this regard, the graphics processor of the data processing system may be provided with outline (or "skeleton") program instructions that replicate one or more stages of the processing pipeline of the target graphics processor when those outline program instructions are supplemented with the executable program instructions and/or further program instructions that replicate the operations of the target graphics processor, as discussed above. The outline ("skeleton") program instructions may, for example, comprise one or more calls to execute executable program instructions and/or further program instructions that will be provided so as to replicate the operations of the target graphics processor.

Thus, embodiments may comprise providing the programmable processing circuitry of the graphics processor of the data processing system with outline program instructions for one or more stages of a processing pipeline of the target graphics processor. Embodiments may then comprise, when the programmable processing circuitry of the graphics processor of the data processing system generates the output, the outline program instructions triggering the execution of (e.g. making one or more calls to) the executable program instructions and/or further program instructions so as to replicate the one or more stages of the processing pipeline. Thus, generating the output may comprise the programmable processing circuitry of the graphics processor of the data processing system executing the outline program instructions to thereby trigger the execution of the executable program instructions and/or further program instructions so as to replicate the one or more stages of the processing pipeline.

These embodiments can, for example, allow at least some program instructions (e.g. for a general class of target graphics processors and/or for a general testing process) to be prepared prior to run time or "offline", e.g. well before the graphics processor is instructed to generate the desired output. This in turn can reduce the amount of processing time and/or resources that are required at run time in order to set up the graphics processor of the data processing system so as to replicate the desired operation of the target graphics processor. Furthermore, these embodiments can still allow the desired executable program instructions and/or further program instructions for replicating the operation of the target graphics processor (e.g. for a specific target graphics processor and/or for a specific testing process) to be executed by the graphics processor of the data processing system at run time by using the outline program instructions to trigger the execution of the more specific executable program instructions and/or further program instructions that replicate the desired operation of the target graphics processor.

The outline program instructions may take any desired and suitable form. For example, the outline program instructions may comprise binary code to be followed by the graphics processor of the data processing system. The outline program instructions may therefore comprise instructions which are specified in the instruction set specification for the graphics processor of the data processing system.

The outline program instructions may also be provided in any desired and suitable way. For example, providing the outline program instructions may comprise providing higher level outline program expressions. The higher level outline program expressions may then be converted (e.g. complied) into the (lower level) outline program instructions. The outline program expressions may be written in any desired and suitable programming language, such as Cuda, OpenCL, Vulkan Compute (VkCompute), etc.

The output generated by replicating the operation of the target graphics processor may take any desired and suitable form. For example, the output generated by replicating the operation of the target graphics processor may comprise all or part of a render output, such as a graphics texture or frame.

As indicated above, the output generated by replicating the operation of the target graphics processor can be "bit-exact" when compared with an output that would have been generated by the target graphics processor itself. Nevertheless, an output generated by replicating the operation of the target graphics processor on the graphics processor of the data processing system may have a different output format to that which would have been generated by the target graphics processor. Thus, embodiments may further comprise converting an output generated by replicating the operation of the target graphics processor to an output format that corresponds to an output that would be generated by the target graphics processor itself. This can then allow the output generated by replicating the operation of the target graphics processor to be processed (e.g. by a driver for the target graphics processor) as though it had been generated by the target graphics processor itself. In this way, the use of the graphics processor of the data processing system in place of the target graphics processor can be transparent to the driver for the target graphics processor.

The output generated by replicating the operation of the target graphics processor may be exported to external, e.g. main, memory of the data processing system, for storage and/or use, such as to a texture buffer or to a frame buffer for a display.

The process of replicating the operation of the target graphics processor may also or instead be analysed so as to generate performance metrics (e.g. execution times, error metrics, etc.) for the target graphics processor. The performance metrics may be exported to external, e.g. main, memory, for storage or display. In these embodiments, the output generated by replicating the operation of the target graphics processor may still be stored and/or used, or may be discarded without being stored and/or without being used.

The target graphics processor that is being replicated on the data processing system may take any desired and suitable form. The target graphics processor may, for example, comprise a graphics processing unit (GPU). The target graphics processor may, for example, form part of a target system on chip (SoC) that is being replicated on the data processing system. The target SoC may comprise any other desired and suitable data processing elements (processing circuitry) that a SoC may include, such as a central processor, display controller, memory controller, image processor, digital signal processor, etc. The target SoC that is being replicated may run an operating system, such as iOS, Android, Windows, etc. The data processing elements (processing circuitry) of the SoC, e.g. other than the target graphics processor, may be replicated on any desired and suitable part of the data processing system, e.g. on a central processor of the data processing system.

The graphics processor of the data processing system may also take any desired and suitable form. The graphics processor of the data processing system may, for example, comprise a general purpose GPU (GPGPU). As indicated above, the target graphics processor and the graphics processor of the data processing system may comprise differently configured hardware ((graphics) processing circuitry). Thus, the target graphics processor may comprise a specialised GPU and/or may not comprise a general purpose GPU (GPGPU).

The processes of providing the program instructions, program expressions, control data, commands, etc., described herein can be performed by or in any desired and suitable part of the data processing system. For example, these processes may be performed by a central processor of the data processing system. Thus, the data processing circuitry described herein may form part of a central processor of the data processing system. The central processor of the data processing system may take any desired and suitable form that central processors may take.

As will be appreciated, the various data processing elements (processors, controllers, etc.) of the data processing system described herein are actually operated in the technology described herein, whereas the target graphics processor (and, e.g., the target data processing system) described herein may be merely notional. However, embodiments may further comprise, subject to satisfactory replication of the operation of the target graphics processor (and, e.g., the target data processing system) described herein, physically providing and/or physically operating that target graphics processor (and, e.g., that target data processing system).

The technology described herein is applicable to any suitable form or configuration of graphics processors, such as tile-based graphics processors. Thus, the target graphics processor and processing pipeline to be replicated may be a tile-based processor and pipeline, respectively.

In embodiments, the data processing system may comprise, and/or may be in communication with, one or more memories and/or memory devices that store the data described herein, and/or store software for performing the processes described herein. The system may comprise, and/or may be in communication with, a central processor, and/or with a display for displaying an (e.g. render) output (frame or image) and/or performance metrics generated as a result of replicating the operation of the target graphics processor.

The technology described herein can be implemented in any suitable system, such as a suitably configured microprocessor based system. In an embodiment, the technology described herein is implemented in a computer and/or micro-processor based system. The various functions of the technology described herein may be carried out on a single data processing platform.

The various functions of the technology described herein can be carried out in any desired and suitable manner. For example, the functions of the technology described herein can be implemented in hardware or software, as desired. Thus, for example, unless otherwise indicated, the various functional elements, stages and "means" of the technology described herein may comprise a suitable processor or processors, controller or controllers, functional units, circuitry, processing logic, microprocessor arrangements, etc., that are operable to perform the various functions, etc., such as appropriately dedicated hardware elements (circuitry) and/or programmable hardware elements (circuitry) that can be programmed to operate in the desired manner.

The various functions, etc., of the technology described herein may be duplicated and/or carried out in parallel on a given processor. Equally, the various processing stages may share processing circuitry, etc., if desired.

Subject to any hardware for carrying out the specific functions discussed above, the data processing system, graphics processor of the data processing system, and central processor of the data processing system can otherwise include any one or more or all of the usual functional units, etc., that data processing systems, graphics processors and central processors may include.

It will also be appreciated by those skilled in the art that all of the described embodiments of the technology described herein can include, as appropriate, any one or more or all of the optional features described herein.

The methods in accordance with the technology described herein may be implemented at least partially using software e.g. computer programs. Thus, embodiments of the technology described herein may comprise computer software specifically adapted to carry out the methods herein described when installed on one or more data processors, a computer program element comprising computer software code portions for performing the methods described herein when the program element is run on one or more data processors, and a computer program comprising code adapted to perform all the steps of a method or of the methods described herein when the program is run on a data processing system. The data processor may be a microprocessor system, a programmable FPGA (field programmable gate array), etc.

The technology described herein also extends to a computer software carrier comprising such software which when used to operate one or more processors of a data processing system causes said one or more processors to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus embodiments of the technology described herein may comprise computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible, non-transitory medium, such as a computer readable medium, for example, diskette, CD-ROM, ROM, RAM, flash memory, or hard disk. It could also comprise a series of computer readable instructions transmittable to a computer system, via a modem or other interface device, either over a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

As discussed above, the technology described herein relates to arrangements in which the operation of a target graphics processor is replicated on a data processing system using a graphics processor of the data processing system. Embodiments of the technology described herein will now be described in more detail with reference to a computer data processing system 100 as shown in FIG. 1.

In this embodiment, the data processing system 100 comprises a central processor ("system CPU") 102 and a graphics processor ("system GPU") 104. In normal use, the system GPU 104, under the control of the system CPU 102, can use a graphics processing pipeline to generate rendered outputs for display in response to graphics API calls processed by a driver 108 for the system GPU 104. In this embodiment, the system GPU 104 comprises a general purpose GPU (GPGPU) that can also perform compute operations in response to compute API calls processed by the driver 108.

In the following embodiments, the data processing system 100 replicates the operation of a target data processing system under development by executing an application 106 that models the operation of that target data processing system. In these embodiments, the target data processing system comprises a target graphics processor, and the data processing system 100 makes use of the system GPU 104 to assist in replicating the operation of that target graphics processor. In this way, the processing time and resources that are consumed when replicating the operation of the target data processing system can be significantly lower than in typical arrangements in which the operation of the target graphics processor is replicated using the system CPU 102 alone.

Figure 2:
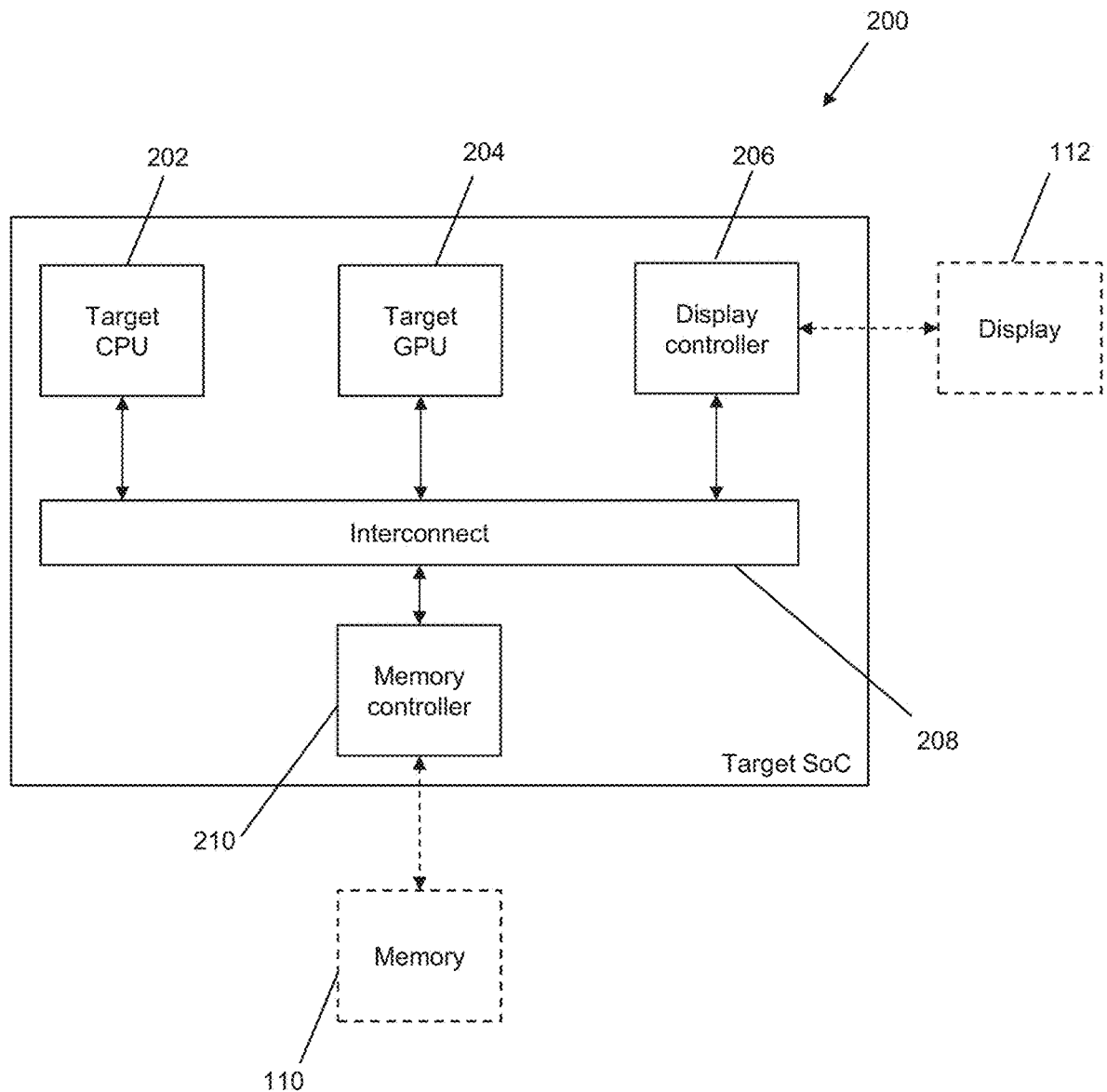
FIG. 2 shows schematically a system on chip comprising a target graphics processor to be replicated in the manner of the technology described herein.

FIG. 2 shows an embodiment of a target data processing system that can be replicated on the data processing system 100 of FIG. 1. In this embodiment, the target data processing system comprises a system on chip ("target SoC") 200 that executes an operating system, such as iOS, Android or Windows. The target SoC 200 comprises a central processor ("target CPU") 202, a graphics processor ("target GPU") 204, a display controller 206, an interconnect 208 and a memory controller 210.

In operation, the target CPU 202, target GPU 204, and display controller 206 will communicate with each other via the interconnect 208. The target CPU 202, target GPU 204, and display controller 206 will also communicate with an external system memory 110 via the interconnect 208 and memory controller 210. The target SoC 200 will also communicate with an external display device 112 via the display controller 206. In operation, the target GPU 204 will use a graphics processing pipeline to generate rendered outputs for display, and store the rendered outputs in the external system memory 110. The display controller 206 will then read in rendered outputs stored in the external system memory 110, and use the rendered outputs to generate output frames for display on the external display device 112.

It should be noted here that the external system memory 110 and external display device 112 do not form part of the target SoC 200. Thus, when the operation of the target SoC 200 is replicated, main memory for the data processing system 100 of FIG. 1 may be used as the external system memory 110 of FIG. 2. Similarly, a display device for the data processing system 100 of FIG. 1 may be used as the external display device 112 of FIG. 2. The display device could comprise, for example, a display comprising an array of pixels, such as a computer monitor, or a printer.

Other arrangements for the target data processing system to be replicated would, of course, be possible. Furthermore, in other embodiments, the data processing system 100 may replicate the operation of a target graphics processor regardless of whether or not that target graphics processor forms part of an overall target data processing system.

Figure 3:
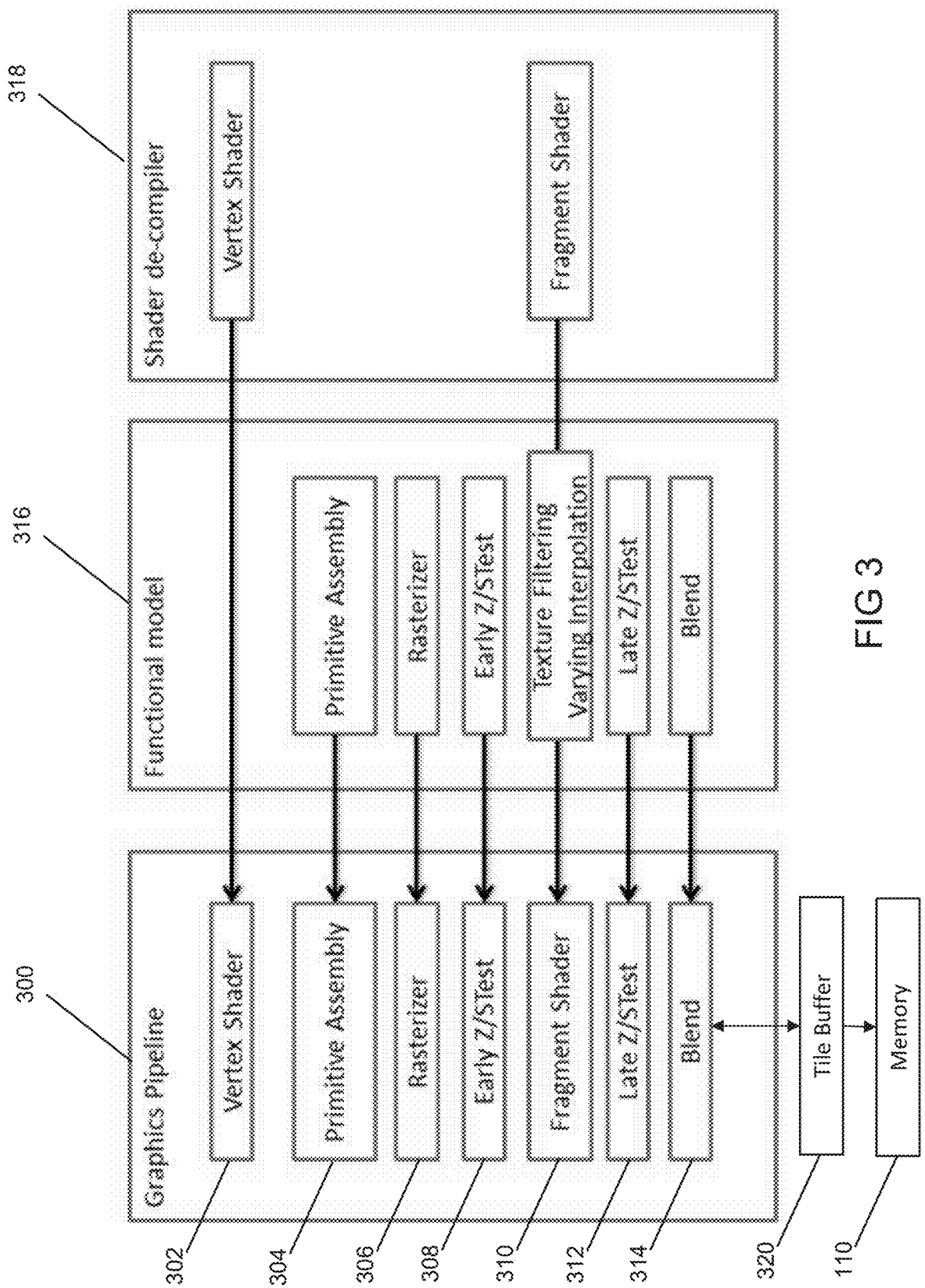
FIG. 3 shows schematically stages of a graphics processing pipeline to be replicated according to an embodiment of the technology described herein.

FIG. 3 shows a graphics processing pipeline 300 that can be replicated by the system GPU 104 when replicating the operation of the target GPU 204 in embodiments of the technology described herein.

In the embodiment of FIG. 3, the graphics processing pipeline 300 is tile-based and will thus produce tiles of a render output data array, such as a graphics texture or frame to be generated. In tile-based rendering, rather than the entire render output, e.g., graphics texture or frame for display, effectively being processed in one go, the render output is divided into a plurality of smaller sub-regions, usually referred to as "tiles". Each tile is rendered separately (e.g. one-after-another), and the rendered tiles are then recombined to provide the complete render output, e.g., graphics texture or frame for display. The render output can be divided into regularly-sized and shaped tiles (such as squares or rectangles), but this is not essential.

In this embodiment, when a computer graphics image is to be generated, it is defined as a series of primitives (polygons), which primitives are then divided (rasterised) into graphics fragments for graphics rendering in turn. During a graphics rendering operation, the renderer modifies the, e.g., colour (red, green and blue, RGB) and transparency (alpha, a), data associated with each fragment so that the fragments can be displayed correctly. Once the fragments have fully traversed the renderer, then their associated data values are stored in memory, ready for output, e.g. for display. The render output data array may be an output frame intended for display on a display device, such as a screen or printer, but may also, for example, comprise intermediate data intended for use in later rendering passes (also known as a "render to texture" output), etc.

FIG. 3 shows the main elements and pipeline stages of the graphics processing pipeline 300 that are relevant to the operation of the present embodiment. As will be appreciated by those skilled in the art there may be other stages of the graphics processing pipeline to be replicated that are not illustrated in FIG. 3.

As is shown in FIG. 3, the graphics processing pipeline 300 to be replicated includes a number of stages, including vertex shader 302, a primitive assembler 304, a rasterisation stage 306, an early Z (depth) and stencil test stage 308, a renderer in the form of a fragment shading stage 310, a late Z (depth) and stencil test stage 312, and a blending stage 314.

The vertex shader 302 takes input data values associated with the vertices, etc., defined for the output to be generated, and processes those data values to generate a set of corresponding "vertex shaded" output data values for use by subsequent stages of the graphics processing pipeline 300. The vertex shading, for example, modifies the input data to take account of the effect of lighting in the image to be rendered. The primitive assembler 304 then assembles primitives to be rendered. The vertex shader 302 and primitive assembler 304 therefore effectively perform all the desired fragment frontend operations, such as transformation and lighting operations, and primitive setup, to setup the primitives to be rendered, in response to control data provided to the graphics processing pipeline 300.

The rasterisation stage 306 of the graphics processing pipeline 300 operates to rasterise the primitives making up the render output (e.g. the graphics texture or the image to be generated) into individual graphics fragments for processing. To do this, the rasteriser 306 receives graphics primitives for rendering, rasterises the primitives to sampling points and generates graphics fragments having appropriate positions (representing appropriate sampling positions) for rendering the primitives. The fragments generated by the rasteriser are then sent onwards to the rest of the pipeline for processing.

The early Z/stencil stage 308 performs a Z (depth) test on fragments it receives from the rasteriser 306, to see if any fragments can be discarded (culled) at this stage. To do this, it compares the depth values of (associated with) fragments issuing from the rasteriser 306 with the depth values of fragments that have already been rendered (these depth values are stored in a depth (Z) buffer that is part of a tile buffer 320) to determine whether the new fragments will be occluded by fragments that have already been rendered (or not). At the same time, an early stencil test is carried out. Fragments that pass the early Z and stencil test stage 308 are then sent to the fragment shading stage 310.

The fragment shading stage 310 performs the appropriate fragment processing operations on the fragments that pass the early Z and stencil tests, so as to process the fragments to generate the appropriate rendered fragment data. This fragment processing may include any suitable and desired fragment shading processes, such as executing fragment shader programs on the fragments, applying textures to the fragments, applying fogging or other operations to the fragments, etc., to generate the appropriate fragment data. In the present embodiment, the fragment shading stage 310 is in the form of a programmable fragment shader that also performs texture filtering and varying interpolation.

There is then a "late" fragment Z and stencil test stage 312, which carries out, inter alia, an end of pipeline depth test on the shaded fragments to determine whether a rendered fragment will actually be seen in the final texture or image. This depth test uses the Z-buffer value for the fragment's position stored in the Z-buffer in the tile buffer 320 to determine whether the fragment data for the new fragments should replace the fragment data of the fragments that have already been rendered, by comparing the depth values of (associated with) fragments issuing from the fragment shading stage 310 with the depth values of fragments that have already been rendered (as stored in the depth buffer). This late fragment depth and stencil test stage 312 also carries out any desired "late" alpha and/or stencil tests on the fragments.

The fragments that pass the late fragment test stage 312 are then subjected to, if required, any desired blending operations with fragments already stored in the tile buffer 320 in the blender 314. Any other remaining desired operations on the fragments, such as dither, etc. are also carried out at this stage.

Finally, the (blended) output fragment data (values) are written to the tile buffer 320 from where they can, for example, be output to a texture buffer or a frame buffer. The depth value for an output fragment is also appropriately written to a Z-buffer in the tile buffer 320.

The tile buffer 320 will store colour and depth buffers that represent an appropriate colour, etc., or Z-value, respectively, for each sampling point that the buffers represent (in essence for each sampling point of a tile that is being processed). These buffers store an array of fragment data that represents part (a tile) of the overall render output (e.g. image to be displayed), with respective sets of sample values in the buffers corresponding to respective pixels of the overall render output (e.g. a single set of sample values may correspond to an output pixel, or each 2×2 set of sample values may correspond to an output pixel where 4× multi-sampling is being used). The tile buffer 320 is provided as part of RAM that is located on (local to) the graphics processing pipeline (graphics processor chip).

In the present embodiment, multisampling is not being used. Thus, in the present embodiment, the tile buffer 320 stores its fragment data as 16×16 arrays (i.e. corresponding to a 16×16 array of sample positions in the output to be generated, e.g., in the graphics texture or image to be displayed). Each 16×16 data position array in the tile buffer 320 accordingly corresponds to a 16×16 texel or pixel "tile" of, e.g., the graphics texture or frame to be displayed.

However, in other embodiments, the tile buffer 320 may store its fragment data as 32×32 arrays (i.e. corresponding to a 32×32 array of sample positions in the output to be generated, e.g., in the graphics texture or image to be displayed). Each 32×32 data position array in the tile buffer may accordingly correspond to (and may "natively" support) a 16×16 texel or pixel "tile" of, e.g., the graphics texture or frame to be displayed, at 4× anti-aliasing (i.e. when taking 4 samples per texel or pixel). In these other embodiments, the data from the tile buffer 320 may be input to a downsampling (multisample resolve) write out unit (not shown), and thence output (written back) to an external memory 110 output buffer, such as a texture buffer or a frame buffer for a display device. In these other embodiments, the downsampling and writeout unit may downsample the fragment data stored in the tile buffer 320 to the appropriate resolution for the output buffer (device), i.e. such that an array of pixel data corresponding to the pixels of the output device is generated, to generate output values (pixels) for output to the output buffer.

Once a tile of the render output has been processed and its data exported to memory 110 (e.g. to a texture buffer or frame buffer in memory 110) for storage, the next tile is then processed, and so on, until sufficient tiles have been processed to generate the entire render output (e.g. graphics texture or frame (image) to be displayed). The process is then repeated for the next render output (e.g. graphics texture or frame) and so on.

As can be seen from FIG. 3, the graphics processing pipeline 300 to be replicated includes a number of processing stages that would usually be implemented by a target GPU 204 using substantially fixed function circuitry, such as the primitive assembler 304, rasteriser 306, the early Z/stencil test stage 308, the texture filtering and varying interpolation functions of the fragment shader 310, the late Z/stencil test stage 312, and the blender 314 (and downsampling (multisample resolve) stage if used). As will be discussed in more detail below, in this embodiment, the various fixed functions of the graphics processing pipeline 300 are replicated using programmable processing circuitry of the system GPU 104 in response to executable program expressions provided by a functional model 316 of the target GPU 204, e.g. rather than being replicated by fixed function processing circuitry of the system GPU 104. This can allow a bit exact output to be generated by the system GPU 104 when compared with the target GPU 204, for example in situations where the fixed function processing circuitry of the system GPU 104 is configured differently from the fixed function processing circuitry of the target GPU 204.

As can also be seen from FIG. 3, the graphics processing pipeline 300 to be replicated includes a number of programmable processing or "shader" stages, such as the vertex shader 302 and the shading functions of the fragment shader 310. In this embodiment, these programmable processing stages are also replicated by the programmable processing circuitry of the system GPU 104, but in response to further program expressions provided by a shader decompiler 318 for the target GPU 204.

Other arrangements for the graphics processing pipeline 300 would, of course, be possible.

Figure 4:
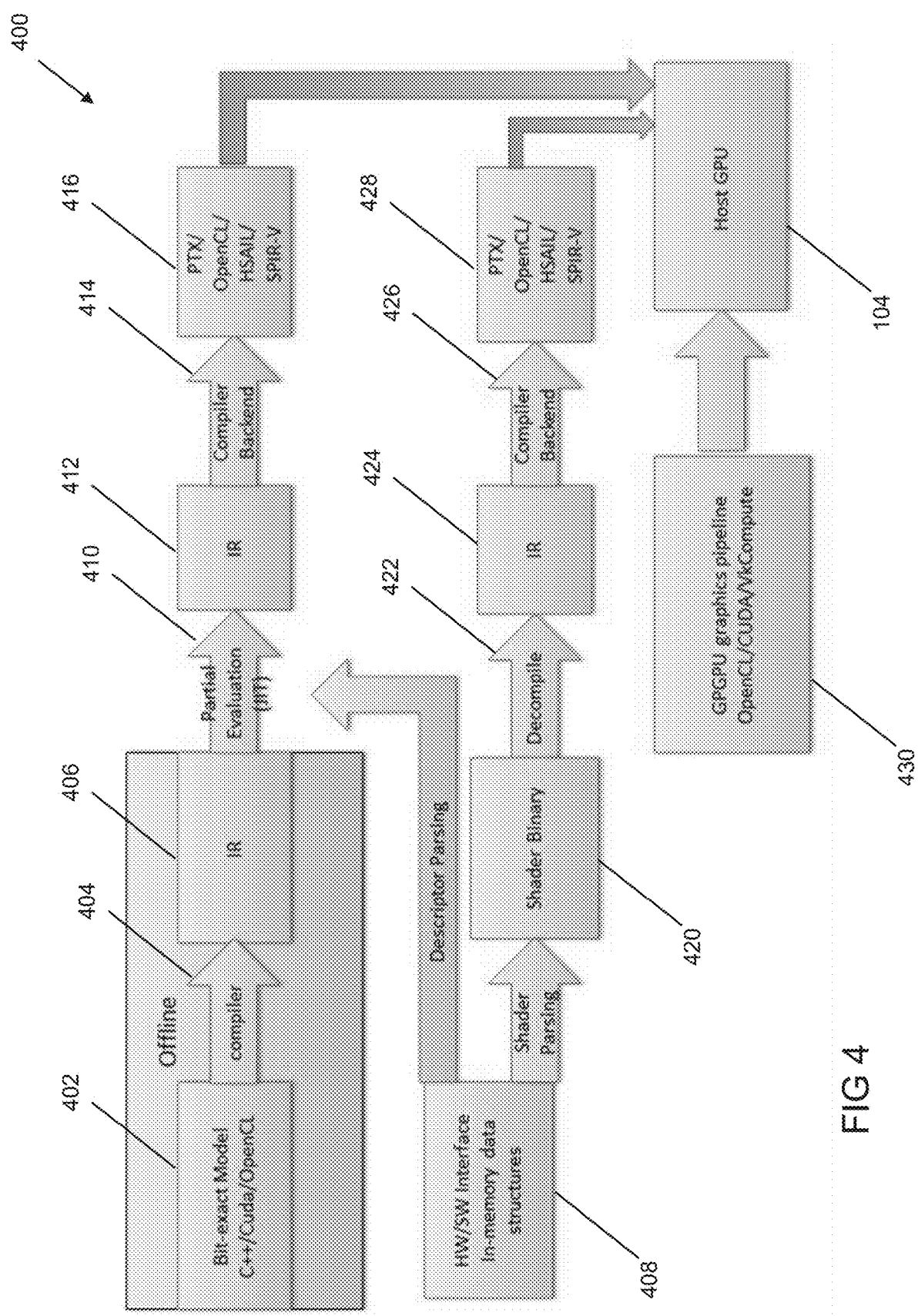
FIG. 4 shows schematically a process of replicating the operation of a target graphics processor on a data processing system according to an embodiment of the technology described herein.

The above describes various features of a target graphics processor and processing pipeline to be replicated. Further details of replicating the operation of a target graphics processor on a data processing system will now be described with reference to FIG. 4, which shows an embodiment of a process 400 of replicating the operation of the target GPU 204 of FIG. 2 on the data processing system 100 of FIG. 1.

In this embodiment, the application 106 running on the system CPU 102 runs a bit-exact model 402 that provides higher level program expressions that are functionally equivalent to the fixed function operations that would be performed by the fixed function processing circuitry of the target GPU 204. In this embodiment, the higher level program expressions are written in C++, Cuda, or OpenCL. A model complier 404 then compiles the higher level program expressions to an LLVM intermediate representation 406 of the higher level program expressions. In this embodiment, these processes are performed prior to run time or "offline" to allow the higher level program expressions to be partially processed in advance.

At run time, when a replicated output is desired, the application 106 provides higher level commands in the form of graphics API calls that are intended for the target GPU 204 to generate the desired graphics output. At this point, the application 106 running on the system CPU 102 replicates the hardware/software interface 408 for the target GPU 204. In this embodiment, replicating the hardware/software interface 408 comprises the system CPU 102 running a driver for the target GPU 204. The driver for the target GPU 204 converts the higher level commands intended for the target GPU 204 into lower level control data (settings and input/output resources) in the form of register access and in-memory data structures (buffers) that can be used by the target GPU 204 when generating the desired graphics output. In this embodiment, since the driver for the target GPU 204 is used, the target GPU 204 can be comprehensively tested.

The system CPU 102 then converts the lower level control data suitable for the target GPU 204 back into higher level commands in the form of graphics API calls that are suitable for the system GPU 104 when generating the desired graphics output. The system CPU 102 then runs a driver for the system GPU 104. The driver for the system GPU 104 converts the higher level commands for the system GPU 104 into lower level control data (settings and input/output resources) in the form of register access and in-memory data structures (buffers) that can be used by the system GPU 104 when generating the desired graphics output.

At this point, a partial evaluation "Just in Time" (JIT) compiler 410 uses the lower level control data for the system GPU 104 to select the particular executable program instructions to be used by the system GPU 104. In this embodiment, when the lower level control data for the system GPU 104 indicates that only a subset of executable program instructions is required (e.g. for a subset of pipeline processing stages), then only that subset of executable program instructions of the set of executable program instructions is provided to the system GPU 104. In this example, the control data indicates that the executable program instructions for multisample resolve are not needed and thus do not need to be provided to the system GPU 104. This can help to reduce the amount of executable program instructions issued to the system GPU 104, and thus improve the processing efficiency of the system GPU 104. In this embodiment, the JIT compiler 410 selects the executable program instructions to be provided to the system GPU 104 by modifying the intermediate representation 406 of the executable program expressions, thereby providing a modified intermediate representation 412. This process allows the executable program instructions to be suitably configured at run time based on the relevant and current control data, whilst still allowing the program expressions for the fixed functions to be partially processed in advance.

The system CPU 102 also runs a compiler backend 414 that converts the modified intermediate representation 412 for the system GPU 104 into a compute API 416. In this embodiment, the compute API 416 comprises a PTX, OpenCL, HSAIL or SPIR-V, API. The compute API 416 is then compiled into lower level instructions in the form of binary code that can be followed by the programmable processing circuitry of the system GPU 104 when generating the desired graphics output.

Also at run time, when the replicated output is desired, the application 106 provides higher level program expressions for shader programs to be executed by the target GPU 204 when generating the desired graphics output. The driver for the target GPU 204 therefore also comprises a compiler that converts the higher level program expressions intended for the target GPU 204 into lower level instructions in the form of shader binary code 420 that can be followed by the shaders of the target GPU 204 when generating the desired graphics output. Again, since the driver for the target GPU 204 is used, the target GPU 204 can be comprehensively tested.

The system CPU 102 then runs a shader decompiler 422 that converts the lower level instructions suitable for the target GPU 204 into an intermediate representation 424 (e.g. higher level program expressions for shader programs to be executed by the system GPU 104 when generating the desired graphics output). The system CPU 102 also runs a compiler backend 426 that converts the intermediate representation 424 into a compute API 428. Again, in this embodiment, the compute API 428 comprises a PTX, OpenCL, HSAIL or SPIR-V, API. The compute API 428 is then converted into lower level instructions in the form of binary code that can be followed by the programmable processing circuitry of the system GPU 104 when generating the desired graphics output.

The system CPU 102 also provides the system GPU 104 with outline (or "skeleton") program instructions that can replicate the processing pipeline of the target GPU 204 when those skeleton program instructions are supplemented with the executable program instructions and shader program instructions discussed above. In particular, the programmable processing circuitry of the system GPU 104 executes the skeleton program instructions, and those skeleton program instructions make appropriate calls to the executable program instructions and shader program instructions so as to replicate the various stages of the processing pipeline of the target GPU 204. In this embodiment, the skeleton program instructions are provided by compiling higher level skeleton program expressions 430 into the lower level skeleton program instructions. In this embodiment, the skeleton program expressions are written in Cuda, OpenCL, or Vulkan Compute (VkCompute). This arrangement allows an invariant framework of program instructions, e.g. for general testing of a general class of target graphics processors, to be prepared and processed offline in advance. This can reduce the amount of processing time and resources that are required at run time in order to set up the desired operation of the system GPU 104.

The system GPU 104 can then replicate the fixed function operations and shader operations of the target GPU 204 to generate the desired graphics output in accordance with the program instructions and control data provided for the system GPU 104. Since the system GPU 104, rather than the system CPU 102, is used to generate the desired graphics output, the process of replicating the operation of the target GPU 204 can be more efficient. Furthermore, since the fixed function operations of the target GPU 204 are replicated by programmable processing circuitry of the system GPU 104 that executes executable program instructions (rather than by fixed function circuitry of the system GPU 104), the system GPU 104 can be made to generate a bit-exact graphics output that has the same precision as that which would have been provided by the target GPU 204 itself.

Once the desired graphics output has been generated, the generated output (in-memory buffers, such as the colour, depth and/or stencil buffer) is converted into an output format for an output (in-memory buffers, such as the colour, depth and/or stencil buffer) as would be generated by the target GPU 204. The converted output is then provided to the driver for the target GPU 204. In this embodiment, since a converted output is provided to the driver for the target GPU 204, the use of the system GPU 104 in place of the target GPU 204 is transparent to the driver for the target GPU 204.

In the above embodiments, the render outputs generated when replicating the operation of the target GPU 204 can be stored for later review and/or displayed on the display device 112, allowing the operation of the target GPU 204 to be visually assessed. Furthermore, in the above embodiments, performance metrics for the target GPU 204, such as processing times and error metrics, can be generated by monitoring and/or analysing the process of replicating the target GPU 204. These performance metrics can be stored for later review and/or displayed on the display device 112 for review.

It can be seen from the above that embodiments of the technology described herein can provide an efficient and comprehensive testing environment when replicating the operation of the target graphics processor on a data processing system, for example when compared with typical arrangements in which the operation of the target graphics processor is replicated in software on a central processor of the data processing system. This is achieved in embodiments of the technology described herein by using a graphics processor of the data processing system to assist in replicating the operation of the target graphics processor.

Furthermore, embodiments of the technology described herein can provide a "bit-exact" testing environment when replicating the operation of the target graphics processor on a data processing system. This is achieved in embodiments of the technology described herein by providing executable program instructions for use by the graphics processor of the data processing system that replicate some or all of the fixed function operations of the target graphics processor, and then causing the programmable processing circuitry of the graphics processor of the data processing system to generate an output in accordance with the executable program instructions, e.g. rather than using fixed function processing circuitry of the graphics processor of the data processing system.

The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

What is claimed is:

1. A method of replicating the operation of a target graphics processor on a data processing system that comprises a graphics processor, the method comprising:
   providing executable program instructions for use by the graphics processor of the data processing system, the executable program instructions replicating fixed function operations that would be performed by substantially fixed function processing circuitry of the target graphics processor with the same precision as would be produced by the substantially fixed function processing circuitry of the target graphics processor; and
   causing programmable processing circuitry of the graphics processor of the data processing system to generate an output, wherein generating the output comprises the programmable processing circuitry executing the executable program instructions to thereby replicate the fixed function operations of the target graphics processor with the same precision as would be produced by the substantially fixed function processing circuitry of the target graphics processor.

2. A method as claimed in claim 1, wherein providing the executable program instructions for use by the graphics processor of the data processing system comprises:
   prior to run time, converting higher level program expressions that are functionally equivalent to the fixed function operations into an intermediate representation of the higher level program expressions; and
   at run time, converting the intermediate representation of the higher level program expressions into the executable program instructions.

3. A method as claimed in claim 1, further comprising:
   at run time, selecting the executable program instructions to be provided for use by the graphics processor of the data processing system based on control data for generating the output.

4. A method as claimed in claim 3, wherein selecting the executable program instructions to be provided for use by the graphics processor of the data processing system comprises:
modifying an intermediate representation of higher level program expressions that are functionally equivalent to the fixed function operations based on the control data for generating the output.

5. A method as claimed in claim 1, further comprising:
providing further program instructions for use by the graphics processor of the data processing system, the further program instructions replicating further operations of the target graphics processor that would be performed by programmable processing circuitry of the target graphics processor, wherein generating the output further comprises the programmable processing circuitry of the graphics processor of the data processing system executing the further program instructions to thereby replicate the further operations of the target graphics processor.

6. A method as claimed in claim 5, wherein providing the further program instructions for the graphics processor of the data processing system comprises converting higher level program expressions intended for the target graphics processor into lower level program instructions, wherein converting the higher level program expressions intended for the target graphics processor into the lower level program instructions comprises using a driver for the target graphics processor.

7. A method as claimed in claim 1, further comprising:
providing the programmable processing circuitry of the graphics processor of the data processing system with outline program instructions for one or more stages of a processing pipeline of the target graphics processor, wherein generating the output comprises the programmable processing circuitry of the graphics processor of the data processing system executing the outline program instructions to thereby trigger the execution of the executable program instructions so as to replicate the one or more stages of the processing pipeline.

8. A method as claimed in claim 1, wherein the executable program instructions for use by the graphics processor of the data processing system replicate at least one of: primitive assembly, rasterisation, early depth testing, early stencil testing, texture filtering, varying interpolation, late depth testing, late stencil testing, blending, and downsampling.

9. A method as claimed in claim 1, wherein the graphics processor of the data processing system comprises a general purpose graphics processor (GPGPU).

10. A data processing system for replicating the operation of a target graphics processor, the data processing system comprising:
a graphics processor comprising programmable processing circuitry; and
data processing circuitry configured to:
provide executable program instructions for use by the graphics processor of the data processing system, the executable program instructions replicating fixed function operations that would be performed by substantially fixed function processing circuitry of the target graphics processor with the same precision as would be produced by the substantially fixed function processing circuitry of the target graphics processor; and
cause programmable processing circuitry of the graphics processor of the data processing system to generate an output, wherein generating the output comprises the programmable processing circuitry executing the executable program instructions to thereby replicate the fixed function operations of the target graphics processor with the same precision as would be produced by the substantially fixed function processing circuitry of the target graphics processor.

11. A system as claimed in claim 10 wherein, when providing the executable program instructions for use by the graphics processor of the data processing system, the data processing circuitry is configured to:
prior to run time, convert higher level program expressions that are functionally equivalent to the fixed function operations into an intermediate representation of the higher level program expressions; and
at run time, convert the intermediate representation of the higher level program expressions into the executable program instructions.

12. A system as claimed in claim 10 wherein the data processing circuitry is further configured to:
at run time, select the executable program instructions to be provided for use by the graphics processor of the data processing system based on control data for generating the output.

13. A system as claimed in claim 12 wherein, when selecting the executable program instructions to be provided for use by the graphics processor of the data processing system, the data processing circuitry is configured to:
modify an intermediate representation of higher level program expressions that are functionally equivalent to the fixed function operations based on the control data for generating the output.

14. A system as claimed in claim 10, wherein the data processing circuitry is further configured to:
provide further program instructions for use by the graphics processor of the data processing system, the further program instructions replicating further operations of the target graphics processor that would be performed by programmable processing circuitry of the target graphics processor, wherein generating the output further comprises the programmable processing circuitry of the graphics processor of the data processing system executing the further program instructions to thereby replicate the further operations of the target graphics processor.

15. A system as claimed in claim 14 wherein, when providing the further program instructions for the graphics processor of the data processing system, the data processing circuitry is configured to convert higher level program expressions intended for the target graphics processor into lower level program instructions, wherein converting the higher level program expressions intended for the target graphics processor into the lower level program instructions comprises using a driver for the target graphics processor.

16. A system as claimed in claim 10, wherein the data processing circuitry is further configured to:
provide the programmable processing circuitry of the graphics processor of the data processing system with outline program instructions for one or more stages of a processing pipeline of the target graphics processor, wherein generating the output comprises the programmable processing circuitry of the graphics processor of the data processing system executing the outline program instructions to thereby trigger the execution of the executable program instructions so as to replicate the one or more stages of the processing pipeline.

17. A system as claimed in claim 10, wherein the executable program instructions for use by the graphics processor of the data processing system replicate at least one of:

primitive assembly, rasterisation, early depth testing, early stencil testing, texture filtering, varying interpolation, late depth testing, late stencil testing, blending, and downsampling.

18. A system as claimed in claim 10, wherein the graphics processor of the data processing system comprises a general purpose graphics processor (GPGPU).

19. A non-transitory computer readable storage medium storing computer software code which, when executing on a data processor of a data processing system that comprises a graphics processor, performs a method of replicating the operation of a target graphics processor on the data processing system, the method comprising:
- providing executable program instructions for use by the graphics processor of the data processing system, the executable program instructions replicating fixed function operations that would be performed by substantially fixed function processing circuitry of the target graphics processor with the same precision as would be produced by the substantially fixed function processing circuitry of the target graphics processor; and
- causing programmable processing circuitry of the graphics processor of the data processing system to generate an output, wherein generating the output comprises the programmable processing circuitry executing the executable program instructions to thereby replicate the fixed function operations of the target graphics processor with the same precision as would be produced by the substantially fixed function processing circuitry of the target graphics processor.

* * * * *